(12) United States Patent
Najarian et al.

(10) Patent No.: US 8,145,585 B2
(45) Date of Patent: Mar. 27, 2012

(54) AUTOMATED METHODS AND SYSTEMS FOR THE DETECTION AND IDENTIFICATION OF MONEY SERVICE BUSINESS TRANSACTIONS

(75) Inventors: Kayvan Najarian, Richmond, VA (US); Alireza Darvish, Sunnyvale, CA (US)

(73) Assignee: University of North Carolina at Charlotte, Charlotte, NC (US)

( * ) Notice: Subject to any disclaimer, the term of this patent is extended or adjusted under 35 U.S.C. 154(b) by 842 days.

(21) Appl. No.: 12/245,757

(22) Filed: Oct. 5, 2008

(65) Prior Publication Data

US 2009/0094182 A1    Apr. 9, 2009

Related U.S. Application Data

(60) Provisional application No. 60/977,672, filed on Oct. 5, 2007, provisional application No. 61/084,386, filed on Jul. 29, 2008.

(51) Int. Cl.
*G06F 17/00* (2006.01)
*G06N 5/02* (2006.01)

(52) U.S. Cl. .............................. 706/46; 706/45; 706/48

(58) Field of Classification Search ........................ None
See application file for complete search history.

(56) References Cited

U.S. PATENT DOCUMENTS

2002/0133721 A1* 9/2002 Adjaoute ...................... 713/201
2003/0061132 A1* 3/2003 Yu et al. ......................... 705/30
2008/0046368 A1* 2/2008 Tidwell et al. ................. 705/44

OTHER PUBLICATIONS

Tang et al., J., "Developing an Intelligent Data Discriminating System of Anti-Money Laundering Based on SVM", Fourth International Conference on Machine Learning and Cybernetics, pp. 3453-, Aug. 18-21, 2005.*
Agnaldo J. Rocha Reis and Alexandre P. Alves Da Silva; Feature Extraction via Multiresolution Analysis for Short-Term Load Forecasting; IEEE Transactions on Power Systems, vol. 20, No. 1, Feb. 2005; Brazilian Reseach Council.
Stefan Pittner and Sagar V. Kamarthi; Feature Extraction From Wavelet Coefficients for Pattern Recognition Tasks; IEEE Transactions on Pattern Analysis and Machine Intelligence, vol. 21, No. 1, Jan. 1999; Boston, MA. in Apr. 1997.
Stephane G. Mallat; A Theory for Multiresolution Signal Decomposition: The Wavelet Representation; IEEE Transaction on Pattern Analysis and Machine Intelligence, vol. 11, No. 7, Jul. 1989; New York, NY.

(Continued)

*Primary Examiner* — Jeffrey A. Gaffin
*Assistant Examiner* — Adrian Kennedy
(74) *Attorney, Agent, or Firm* — Clements Bernard PLLC; Christopher L. Bernard; Lawrence A. Baratta, Jr.

(57) ABSTRACT

The present disclosure provides an automated method for the detection and identification of money service business transactions, including: performing a preprocessing operation, wherein the preprocessing operation includes filtering a dataset; performing a feature extraction operation, wherein the feature extraction operation includes extracting predetermined features from a transaction signal; performing a statistical analysis operation for the testing of significance of extracted features and dimension reduction; and performing one or more of a nonlinear classification operation and a linear classification operation, wherein the nonlinear or linear classification operation includes classifying data that appears to be related to a money service business transaction.

16 Claims, 3 Drawing Sheets

OTHER PUBLICATIONS

Alex Aussem, Jonathan Campbell, and Fionn Murtagh; Wavelet-Based Feature Extraction and Decomposition Strategies for Financial Forecasting; Journal of Computational Intelligence in Finance, 1997; Aubiere Cedex France and Northern Ireland.

Alireza Darvish, Kayvan Najarian, Daniel C. Kern and Agus Sudjianto; Wavelet and Fourier Based Signal Processing for Detection of Unknown Money Service Businesses; University of North Carolina at Charlotte, Bank of America Project, Charlotte, NC.

* cited by examiner

AUTOMATED METHODS AND SYSTEMS FOR THE DETECTION AND IDENTIFICATION OF MONEY SERVICE BUSINESS TRANSACTIONS

CROSS-REFERENCE TO RELATED APPLICATION(S)

The present non-provisional patent application claims the benefit of priority of U.S. Provisional Patent Application No. 60/977,672, filed on Oct. 5, 2007, and entitled "DETECTION AND IDENTIFICATION OF MONEY SERVICE BUSINESSES" and U.S. Provisional Patent Application No. 61/084,386, filed on Jul. 29, 2008, and entitled "DETECTION AND IDENTIFICATION OF MONEY SERVICE BUSINESSES," the contents of which are incorporated in full by reference herein.

FIELD OF THE INVENTION

The present invention relates generally to automated methods and systems for the detection and identification of money service business transactions. More specifically, the present invention relates to automated methods and systems for the detection and identification of money service business transactions that include a preprocessing algorithm, a feature extraction algorithm, a statistical analysis algorithm for the testing of significance and dimension reduction, and a nonlinear classification algorithm. Advantageously, the automated methods and systems of the present invention are based on unified signal processing and nonlinear pattern recognition, and analyze financial institution customer transaction histories to detect and identify previously unknown money service businesses.

BACKGROUND OF THE INVENTION

Money laundering and other illegal/anti-competitive financial activities, often performed by previously unknown money service businesses (MSBs), are a tremendous threat to financial institutions. The failure to detect and identify previously unknown MSBs can be highly detrimental to the healthy function of these financial institutions, and is often linked to terrorism and/or other criminal activities. This is one of the most challenging problems that financial institutions face in the modern world. In order to address this issue, various methodologies have been proposed that combine computer algorithms with subsequent human expert analysis to detect, identify, investigate, and report suspicious MSB-like activities. Despite the advances in such semi-automated, semi-manual methodologies, detecting and identifying previously unknown MSBs is still a very difficult and time consuming process, requiring various human experts to carefully investigate many thousands of cases involving potentially suspicious customers and transactions that have been selected from millions of customers and transactions. These methodologies are simply not suitable in light of the volume of database information that must be processed every day. The transaction characteristics that typically define a MSB include: the use of money orders, the use of traveler's checks, the use of electronic money transmissions, unusual check cashing activities, unusual currency exchanges, currency dealing transactions, and stored value scenarios.

Thus, what is still needed in the art are automated methods and systems for the detection and identification of previously unknown MSB transactions, such that human experts can be more efficiently utilized in investigation and reporting roles, thereby streamlining the law enforcement process.

BRIEF SUMMARY OF THE INVENTION

In various exemplary embodiments, the present invention provides automated methods and systems for the detection and identification of MSB transactions that include a preprocessing algorithm, a feature extraction algorithm, a statistical analysis algorithm for the testing of significance and dimension reduction, and a nonlinear classification algorithm. Advantageously, the automated methods and systems of the present invention are based on unified signal processing and nonlinear pattern recognition, and analyze financial institution customer transaction histories to detect and identify previously unknown MSBs. The unified signal processing algorithm raises a red flag if a customer that has not previously declared itself as a MSB performs cash/check/wire transactions that match the pattern of a MSB. The present invention first defines signal processing features that can distinguish the behavioral patterns of a normal business from those of a MSB. These features include two types: time based features extracted from transaction signals (e.g. the average amount of transactions, the average number of transactions, etc.) and frequency domain features extracted from transaction signals (e.g. wavelet and Fourier based features). Both wavelet and Fourier transforms, along with time domain features, are used to extract features from one dimensional and two dimensional signals. After feature extraction, a nonlinear classifier, fed with signal processing features as input, is trained to classify customer business behavior as either normal (i.e. non-MSB) or suspicious (i.e. MSB). Neural networks, classification and regression trees (CARTs), and Adaboost trees are used as classifiers, for example. The nonlinear classifier is trained and tested using a database of previously identified cases.

In one exemplary embodiment, the present invention provides an automated method for the detection and identification of money service business transactions, including: performing a preprocessing operation, wherein the preprocessing operation includes filtering a dataset; performing a feature extraction operation, wherein the feature extraction operation includes extracting predetermined features from a transaction signal; performing a statistical analysis operation for the testing of significance of extracted features and dimension reduction; and performing one or more of a nonlinear classification operation and a linear classification operation, wherein the nonlinear or linear classification operation includes classifying data that appears to be related to a money service business transaction. Filtering the dataset includes one or more of removing data from the dataset that is related to money service businesses having transactions below a predetermined number and removing data from the dataset that is related to money service businesses that are classified as inactive. Extracting predetermined features from the transaction signal includes extracting one or more of a time domain based feature from the transaction signal and a transform domain based feature from the transaction signal. The time domain based feature is of a type selected from the group consisting of a cash type, a possible cash type, a wire type, an automated clearing house type, a transfer type, and a fee type. The time domain based feature is also of a type selected from the group consisting of a cash out type, a cash in type, a volume out type, and a volume in type. The transform domain based feature is one of a wavelet based feature and a Fourier based feature. Performing the statistical analysis operation for the testing of significance of extracted features and dimension reduction includes determining which extracted features are differentially distributed across non-money service business and money service business populations. Classifying data that appears to be related to a money service business transaction includes applying one or more of a multilayer feedforward sigmoid neural network, a nonlinear classification and regression tree, another nonlinear technique, and a linear technique to a dataset.

In another exemplary embodiment, the present invention provides an automated system for the detection and identification of money service business transactions, including: a preprocessing algorithm for filtering a dataset; a feature extraction algorithm for extracting predetermined features from a transaction signal; a statistical analysis algorithm for the testing of significance of extracted features and dimension reduction; and one or more of a nonlinear classification algorithm and a linear classification algorithm for classifying data that appears to be related to a money service business transaction. Filtering the dataset includes one or more of removing data from the dataset that is related to money service businesses having transactions below a predetermined number and removing data from the dataset that is related to money service businesses that are classified as inactive. Extracting predetermined features from the transaction signal includes extracting one or more of a time domain based feature from the transaction signal and a transform domain based feature from the transaction signal. The time domain based feature is of a type selected from the group consisting of a cash type, a possible cash type, a wire type, an automated clearing house type, a transfer type, and a fee type. The time domain based feature is also of a type selected from the group consisting of a cash out type, a cash in type, a volume out type, and a volume in type. The transform domain based feature is one of a wavelet based feature and a Fourier based feature. Performing the statistical analysis operation for the testing of significance of extracted features and dimension reduction includes determining which extracted features are differentially distributed across non-money service business and money service business populations. Classifying data that appears to be related to a money service business transaction includes applying one or more of a multilayer feedforward sigmoid neural network, a nonlinear classification and regression tree, another nonlinear technique, and a linear technique to a dataset.

In a further exemplary embodiment, the present invention provides an automated method for monitoring customer transaction information and identifying irregularities in customer transaction histories to identify previously unknown money service businesses, including: developing a model of non-money service business transaction behavior; developing a model of money service business transaction behavior; comparing customer transaction histories to the model of non-money service business transaction behavior and the model of money service business transaction behavior; and identifying which customer service transaction histories match substantially match the model of money service business transaction behavior within a predetermined mathematical threshold.

In a still further exemplary embodiment, the present invention provides an automated system for monitoring customer transaction information and identifying irregularities in customer transaction histories to identify previously unknown money service businesses, including: a modeling algorithm for developing a model of non-money service business transaction behavior; a modeling algorithm for developing a model of money service business transaction behavior; a comparison algorithm for comparing customer transaction histories to the model of non-money service business transaction behavior and the model of money service business transaction behavior; and an identification algorithm for identifying which customer service transaction histories match substantially match the model of money service business transaction behavior within a predetermined mathematical threshold.

BRIEF DESCRIPTION OF THE DRAWINGS

The present invention is illustrated and described herein with reference to the various drawings, in which like reference numbers are used to denote like method steps/system components, as appropriate, and in which.

DETAILED DESCRIPTION OF THE INVENTION

Figure 1:
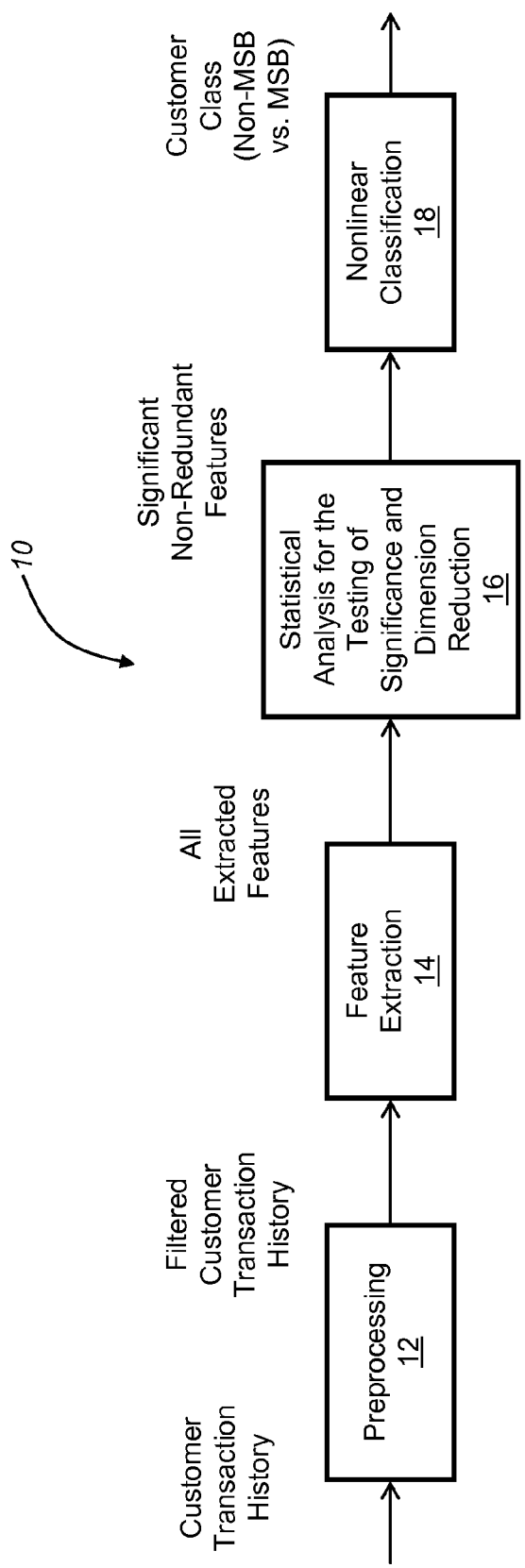
FIG. 1 is a schematic flow diagram illustrating one exemplary embodiment of an automated method for the detection and identification of MSB transactions of the present invention.

Referring to FIG. 1, in one exemplary embodiment, the present invention provides an automated method/system 10 for the detection and identification of MSB transactions that includes a preprocessing algorithm 12, a feature extraction algorithm 14, a statistical analysis algorithm 18 for the testing of significance and dimension reduction, and a nonlinear classification algorithm 20. The input consists of a dataset related to two groups of customers: non-MSBs and previously known MSBs, as well as the transactions to be analyzed.

In the preprocessing step 12, two major filtering functions are performed. First, the non-MSB customers having very few transactions are filtered and removed from the pool because a potential MSB customer is expected to have a larger number of transactions. Second, registered MSB customers not actively engaged in MSB transactions are removed from the pool, as extracting features from them can distort the behavioral patterns of true MSB customers. Again, the non-MSB customers having very few transactions are not considered.

The next step is the feature extraction step 14. After the feature extraction step 14, a statistical test is performed on each feature across the non-MSB and MSB customers in the statistical analysis step 16. A t-test is used to determine the significance of the extracted features. The null hypothesis is that the distribution of each feature across the two datasets is the same. Only significant features are fed into the nonlinear classification step 18, for which the t-test rejected the null hypothesis. The nonlinear classification step 18 is trained to classify the new data (i.e. records in the test dataset) into either non-MSB or MSB classes. Two types of nonlinear classifiers are used: multilayer feedforward neural networks and nonlinear CARTs. Adaboost trees and linear classifiers can also be used.

In the feature extraction step 14, it is known that digital signal processing methodologies can extract features from time series that are not perceptible to the human eye. These features can be extracted from signals expressed in either the time domain or the transform domain. Specifically, the set of all practically useful features can be categorized into two major types: time domain based features and transform domain (i.e. wavelet and Fourier) based features. Time domain based features, such as the time between two consecutive check transactions, can be extracted from the time signal and are easily perceived and interpreted by human experts. Transform domain based features, however, are difficult for human experts to perceive and interpret, and are known to extract some important features for time series classification.

Related to time domain based features for MSB detection, the data available about each customer contains all of the customers' every day transactions. For each transaction, the time and amount of the transaction is available. The time domain based features are defined based on two major characteristics: type and volume of the transactions. Each transaction can be one of the following types:

1. Cash (transaction that has definitely used cash);
2. Possible Cash (transaction that has likely used cash);
3. Wire (transaction via wire transfer);
4. ACH (transaction via automated clearing house);
5. Transfer (transaction that has transferred funds from one account to another); and
6. Fee (transaction that has been conducted to pay a bill, service, etc.).

Each category is based on either the method of the transaction or the objective of the transaction. In addition, each transaction can be either cash in or cash out. Thus, for each category, i.e. type i, two features are defined:

$$FTcout_i = (1/M)\Sigma(r=1,M)((1/D)\Sigma(S=1,D)Trcout_i(r,s)) \quad (1)$$

and $$FTcin_i = (1/M)\Sigma(r=1,M)((1/D)\Sigma(S=1,D)Trcin_i(r,s)) \quad (2)$$

where M is the number of active months, D is the number of active days in each month, $Trcout_i(r,s)$ is the number of cash out transactions of type i in the sth day of the rth month, and $Trcin_i(r,s)$ is the number of cash in transactions of type i in the sth day of the rth month. Equation (1) calculates the average number of cash out transactions of type i per month. Equation (2) calculates the average number of cash in transactions of type i per month. Thus, twelve time domain based features are defined based on the types of transactions. The significance of each feature is determined by applying a t-test. It is determined how many of these features are differently distributed across non-MSB and MSB samples.

Next, for the same types of transactions, another set of features is defined based on the volume of the transactions:

$$FVcout_i = (1/M)\Sigma(r=1,M)((1/D)\Sigma(S=1,D)TVcout_i(r,s)) \quad (3)$$

and $$FVcin_i = (1/M)\Sigma(r=1,M)((1/D)\Sigma(S=1,D)TVcin_i(r,s)) \quad (4)$$

Equation (3) calculates the average amount of cash out for transactions of type i per month and $TVcout_i(r,s)$ is the amount of cash out transactions of type i in the sth day of the rth month. Equation (4) calculates the average amount of cash in for transactions of type i per month and $TVcin_i(r,s)$ is the amount of cash in transactions of type i in the sth day of the rth month.

While the time domain based features provide some useful description of customer behavior, they do not reveal information regarding patterns hidden in the frequency of the transactions. It is expected that most MSB customers use similar frequency patterns for cash out and cash in transactions. Therefore, it is logical to expect that the rates of cash out and cash in transactions are similar for different MSB samples. Wavelet and Fourier transforms are used to extract these types of features.

Figure 2:
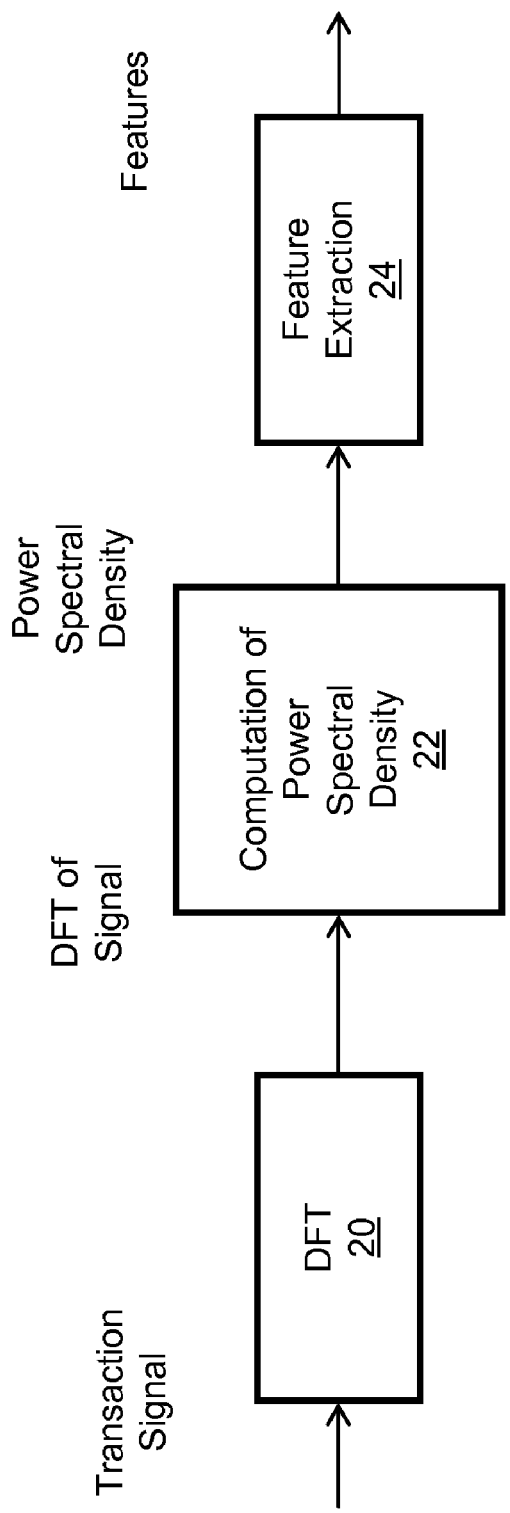
FIG. 2 is a schematic flow diagram illustrating extraction of frequency based features using a Fourier transform in accordance with the automated method of FIG. 1.

Referring to FIG. 2, frequency based features are extracted using a Fourier transform. In the discrete Fourier transform (DFT) step 20, the DFT of discrete signal x with length N is:

$$X(k) = \Sigma(i=1,N)x(i)\omega_N^{(i-1)(k-1)} \quad (5)$$

where $$\omega_N = e^{(-2\pi i)/N} \quad (6)$$

In the power spectral density step 22, the power spectral density (i.e. power spectrum) of signal x is a measurement of the power at various frequencies and is obtained via:

$$PSD = (X \cdot X^*)/M \quad (7)$$

where M is the number of points used in the computation of the fast Fourier transform (FFT) of X. From a plot of a transaction signal and its power spectrum based on the period of the transaction signal, it can be seen that the power spectrum has its highest peak on the major period of the transaction signal.

In the feature extraction step 24, two types of features are defined based on the power spectral density (PSD):

$$F_1 = \arg\max_d PSD(d) \quad (8)$$

where d is the period based on days/cycle. This feature introduces the major period of the transaction signal. The second feature is defined as:

$$F_2 = \Sigma(i=1,10) \text{ratio}(i) \quad (9)$$

where $$\text{ratio}(i) = PSD\text{sorted}(1)/PSD\text{sorted}(i) \quad (10)$$

where PSDsorted is the sorted transform of PSD in descending order.

Feature $F_1$ distinguishes between non-MSB and MSB samples in two major ways. First, in the majority of MSB samples there exists a dominant frequency (i.e. period) that is missing in many non-MSB samples. Second, in a small portion of non-MSB samples where a major frequency (i.e. period) exists, this frequency (i.e. period) is measurably smaller (i.e. larger) than the dominant frequency (i.e. period) of MSB samples. Therefore, this feature can effectively highlight both of these differences across non-MSB and MSB customers.

Feature $F_2$ determines whether the majority of the power of a transaction signal is in one frequency or is distributed across a range of frequencies. Accumulation of the power around the dominant frequency means that the transaction signal has a major dominant frequency, which is true for almost all MSB patterns. The scattering of the power across a range of frequencies, on the other hand, means that the transaction signal has no major dominant frequency, which is true for almost all non-MSB patterns.

Figure 3:
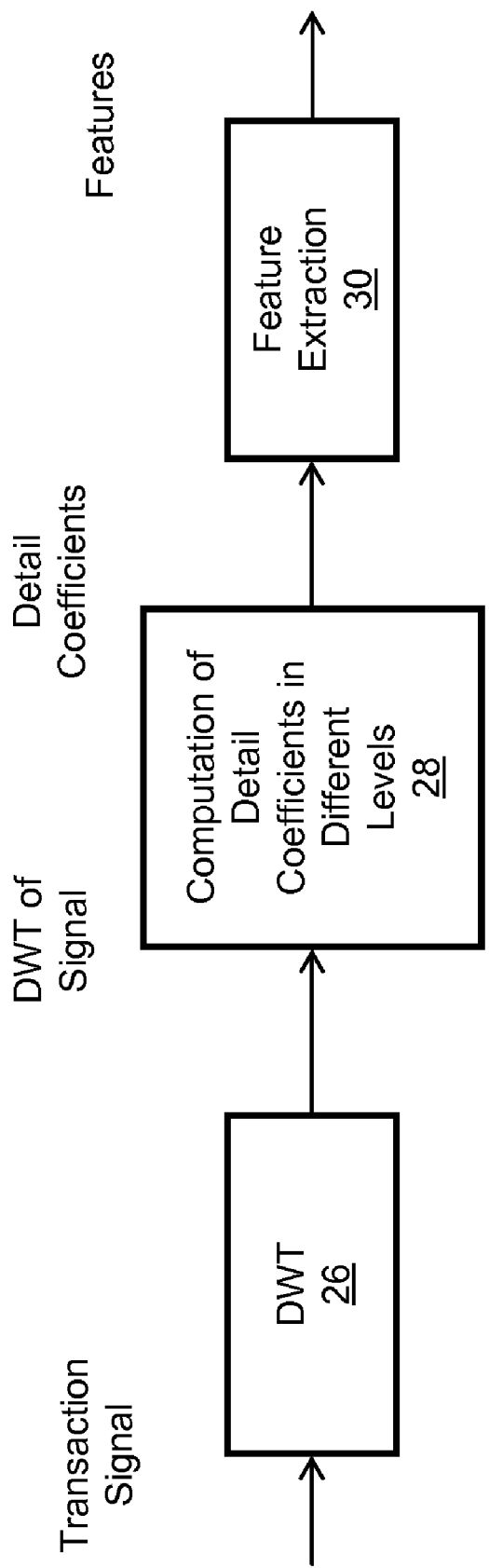
FIG. 3 is a schematic flow diagram illustrating extraction of frequency based features using a discrete wavelet transform in accordance with the automated method of FIG. 1.

Referring to FIG. 3, besides a Fourier transform, a discrete wavelength transform (DWT) can also reveal important characteristics of MSB signals. This is based on the fact that more signal power lies in the low scales (i.e. high frequencies) of a signal and can be extracted using wavelet analysis. Following a DWT step 26, the approximation and detail coefficients of the DWT are computed in a detail coefficient step 28. The detail coefficients are in K different decomposition levels. In a feature extraction step 30, the feature $F_3$ is defined as:

$$F_3 = \text{median}(|L_i - L|) \; i = 1, \ldots, K \quad (11)$$

where $L_i$ is the ith detail coefficient of the first level that corresponds to the lowest scale information of the signal and L is the median of all coefficients. This feature is a measure of the power of the signals in very low scale (i.e. high frequency). The result of the statistical tests between the values of this feature in non-MSB and MSB samples illustrates that this feature is differentially distributed between the two classes.

The wavelet mother function used is the "coiflet" function and the level of decomposition is set to 4. Other levels of wavelet transform can be used to obtain more features, but there helpfulness is typically less than that of the first level. Features can be selected based upon a Kruskal-Wallis test and an Akaike Information Criteria (AIC) of logistic regression is conducted to choose the final set of features.

Two types of nonlinear classifiers are used to classify the non-MSB and MSB samples: multilayer feedforward sigmoid neural networks and nonlinear CARTs. Adaboost trees and linear classifiers can also be used. The features fed to these nonlinear classifiers are the ones discovered to be differentially distributed across non-MSB and MSB populations. Table 1 illustrates all of the features chosen after applying a t-test.

TABLE 1

Features Chosen After Applying T-Test
Features Chosen After Applying T-Test

1. $FTcout_4$ 2. $FTcin_2$ 3. $FVcout_4$ 4. $FVcin_2$
5-7. $F_1, F_2,$ and $F_3$ A neural network (NN) with one hidden layer is used. The number of neurons in the hidden layer of the NN is set to 4, which is chosen considering the number of features (7) and the number of samples in each class (243). A higher number of hidden neurons would give a higher training accuracy, but it would also overfit and result in lower accuracy in the testing dataset. The activation function is "tan h(x)" in the hidden layer and "linear" in the output neuron. The training algorithm is Levenberg-Marquardt backpropagation.

The CART used is the standard algorithm introduced by Breiman. The level of pruning is set to 1, which corresponds to a cross validation method used on the training data set.

The dataset used includes 243 non-MSB and 243 previously known MSB cases. These were obtained after intensive filtering of the inactive MSBs, as well as filtering of those with very few transactions. In order to evaluate the performance of the NN and CART, a 4-fold cross validation analysis was performed on each. Each nonlinear classifier was trained/tested four times and at each run ¾ of the dataset was chosen as the training set and the remaining data was chosen as the testing set. Table 2 illustrates the sensitivity and specificity for each fold of the NN. Table 3 illustrates the same information for the CART. As illustrated, in all cases the sensitivity and specificity are above 95%, and in some cases are 100%. Sensitivity and specificity are comparable for for the Adaboost tree.

TABLE 2

Performance Results for the NN in the Testing Dataset

| | Fold | | | |
| --- | --- | --- | --- | --- |
| | n = 1 | n = 2 | n = 3 | n = 4 |
| Sensitivity | 100% | 98% | 95% | 97% |
| Specificity | 97% | 98% | 100% | 95% |

TABLE 3

Performance Results for the CART in the Testing Dataset

| | Fold | | | |
| --- | --- | --- | --- | --- |
| | n = 1 | n = 2 | n = 3 | n = 4 |
| Sensitivity | 100% | 98% | 95% | 97% |
| Specificity | 97% | 98% | 100% | 95% |

As also illustrated, feature extraction had a significant impact on the results of the classification. Because the structure of both nonlinear classifiers chosen was standard, credit for the high performance in the results of the classification must be given to the features introduced. It should be noted that a linear classifier can also be utilized, but can result in slightly dimished results. This dimishment is acceptable in some cases in light of processing efficiency concerns.

Again, the present invention provides automated methods and systems for the detection and identification of MSB transactions that include a preprocessing algorithm, a feature extraction algorithm, a statistical analysis algorithm for the testing of significance and dimension reduction, and a nonlinear classification algorithm. Advantageously, the automated methods and systems of the present invention are based on unified signal processing and nonlinear pattern recognition, and analyze financial institution customer transaction histories to detect and identify previously unknown MSBs. The unified signal processing algorithm raises a red flag if a customer that has not previously declared itself as a MSB performs cash/check/wire transactions that match the pattern of a MSB. The present invention first defines signal processing features that can distinguish the behavioral patterns of a normal business from those of a MSB. These features include two types: time based features extracted from transaction signals (e.g. the average amount of transactions, the average number of transactions, etc.) and frequency domain features extracted from transaction signals (e.g. wavelet and Fourier based features). Both wavelet and Fourier transforms, along with time domain features, are used to extract features from one dimensional and two dimensional signals. After feature extraction, a nonlinear classifier, fed with signal processing features as input, is trained to classify customer business behavior as either normal (i.e. non-MSB) or suspicious (i.e. MSB). Neural networks and CARTs are used as classifiers, for example. Adaboost trees and linear classifiers can also be used. The nonlinear classifier is trained and tested using a database of previously identified cases.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention, are contemplated thereby, and are intended to be covered by the following claims.

What is claimed is:

1. An automated method for the detection and identification of money service business transactions, comprising:
performing a preprocessing operation, wherein the preprocessing operation comprises filtering a dataset;
performing a feature extraction operation, wherein the feature extraction operation comprises extracting predetermined features from a transaction signal, and wherein extracting predetermined features from the transaction signal comprises extracting one or more of a time domain based feature from the transaction signal and a transform domain based feature from the transaction signal;

performing a statistical analysis operation for the testing of significance of extracted features and dimension reduction; and performing one or more of nonlinear classification operation and a linear classification operation, wherein the nonlinear or linear classification operation comprises classifying data that appears to be related to a money service business transaction.

2. The automated method of claim 1, wherein filtering the dataset comprises one or more of removing data from the dataset that is related to money service businesses having transactions below a predetermined number and removing data from the dataset that is related to money service businesses that are classified as inactive.

3. The automated method of claim 1, wherein the time domain based feature is of a type selected from the group consisting of a cash type, a possible cash type, a wire type, an automated clearing house type, a transfer type, and a fee type.

4. The automated method of claim 1, wherein the time domain based feature is of a type selected from the group consisting of a cash out type, a cash in type, a volume out type, and a volume in type.

5. The automated method of claim 1, wherein the transform domain based feature is one of a wavelet based feature and a Fourier based feature.

6. The automated method of claim 1, wherein performing the statistical analysis operation for the testing of significance of extracted features and dimension reduction comprises determining which extracted features are differentially distributed across non-money service business and money service business populations.

7. The automated method of claim 1, wherein classifying data that appears to be related to a money service business transaction comprises applying one or more of a multilayer feedforward sigmoid neural network, a nonlinear classification and regression tree, another nonlinear technique, and a linear technique to a dataset.

8. An automated system for the detection and identification of money service business transactions, comprising:
  a computer, wherein the computer executes instructions embedded in software comprising:
    a preprocessing algorithm for filtering a dataset;
    a feature extraction algorithm for extracting predetermined features from a transaction signal, wherein extracting predetermined features from the transaction signal comprises extracting one or more of a time domain based feature from the transaction signal and a transform domain based feature from the transaction signal;
    a statistical analysis algorithm for the testing of significance of extracted features and dimension reduction; and
    one or more of a nonlinear classification algorithm and a linear classification algorithm for classifying data that appears to be related to a money service business transaction; and
  an output for displaying results to a user.

9. The automated system of claim 8, wherein filtering the dataset comprises one or more of removing data from the dataset that is related to money service businesses having transactions below a predetermined number and removing data from the dataset that is related to money service businesses that are classified as inactive.

10. The automated system of claim 8, wherein the time domain based feature is of a type selected from the group consisting of a cash type, a possible cash type, a wire type, an automated clearing house type, a transfer type, and a fee type.

11. The automated system of claim 8, wherein the time domain based feature is of a type selected from the group consisting of a cash out type, a cash in type, a volume out type, and a volume in type.

12. The automated system of claim 8, wherein the transform domain based feature is one of a wavelet based feature and a Fourier based feature.

13. The automated system of claim 8, wherein performing the statistical analysis operation for the testing of significance of extracted features and dimension reduction comprises determining which extracted features are differentially distributed across non-money service business and money service business populations.

14. The automated system of claim 8, wherein classifying data that appears to be related to a money service business transaction comprises applying one or more of a multilayer feedforward sigmoid neural network, a nonlinear classification and regression tree, another nonlinear technique, and a linear technique to a dataset.

15. An automated method for monitoring customer transaction information and identifying irregularities in customer transaction histories to identify previously unknown money service businesses, comprising:
  developing a model of non-money service business transaction behavior;
  developing a model of money service business transaction behavior;
  comparing customer transaction histories to the model of non-money service business transaction behavior and the model of money service business transaction behavior; and
  identifying which customer service transaction histories substantially match the model of money service business transaction behavior within a predetermined mathematical threshold.

16. An automated system for monitoring customer transaction information and identifying irregularities in customer transaction histories to identify previously unknown money service businesses, comprising:
  a computer, wherein the computer executes instructions embedded in software, comprising:
    a modeling algorithm for developing a model of non-money service business transaction behavior;
    a modeling algorithm for developing a model of money service business transaction behavior;
    a comparison algorithm for comparing customer transaction histories to the model of non-money service business transaction behavior and the model of money service business transaction behavior; and
    an identification algorithm for identifying which customer service transaction histories substantially match the model of money service business transaction behavior within a predetermined mathematical threshold; and
  an output for displaying results to a user.

* * * * *